United States Patent
Von Grunberg et al.

(10) Patent No.: US 9,297,365 B2
(45) Date of Patent: Mar. 29, 2016

(54) ALTERNATIVE MECHANICAL AND ELECTRICAL CONCEPT FOR OFFSHORE WIND FARMS

(71) Applicant: ABB Technology AG, Zurich (CH)

(72) Inventors: Hubertus Von Grunberg, Zurich (CH); Peter Terwiesch, Mannheim (DE)

(73) Assignee: ABB Technology AG, Zurich (CH)

( * ) Notice: Subject to any disclaimer, the term of this patent is extended or adjusted under 35 U.S.C. 154(b) by 209 days.

(21) Appl. No.: 14/108,980

(22) Filed: Dec. 17, 2013

(65) Prior Publication Data

US 2014/0103665 A1 Apr. 17, 2014

Related U.S. Application Data

(63) Continuation of application No. PCT/EP2011/060112, filed on Jun. 17, 2011.

(51) Int. Cl.
*F03D 11/04* (2006.01)
*F03D 9/00* (2006.01)

(52) U.S. Cl.
CPC .............. *F03D 11/04* (2013.01); *F03D 9/002* (2013.01); *F03D 11/045* (2013.01); *F05B 2240/95* (2013.01); *F05B 2240/96* (2013.01); *Y02E 10/727* (2013.01)

(58) Field of Classification Search
CPC ....... F03D 11/045; F03D 9/002; F03D 11/04; Y02E 10/727
USPC ....................................... 290/44, 55
See application file for complete search history.

(56) References Cited

U.S. PATENT DOCUMENTS

| | | | |
|---|---|---|---|
| 2006/0163880 A1* | 7/2006 | Wobben | 290/44 |
| 2008/0240864 A1* | 10/2008 | Belinsky | 405/223.1 |
| 2009/0072544 A1* | 3/2009 | Pao | 290/55 |
| 2010/0230965 A1* | 9/2010 | Pitre et al. | 290/42 |
| 2010/0278630 A1 | 11/2010 | Yamamoto et al. | |
| 2011/0037264 A1* | 2/2011 | Roddier et al. | 290/44 |

(Continued)

FOREIGN PATENT DOCUMENTS

| CN | 1633558 A | 6/2005 |
|---|---|---|
| CN | 201416515 Y | 3/2010 |

(Continued)

OTHER PUBLICATIONS

International Preliminary Report on Patentability Application No. PCT/EP2011/060112 Completed: Oct. 15, 2013 14 pages.

(Continued)

*Primary Examiner* — Tulsidas C Patel
*Assistant Examiner* — Viet Nguyen
(74) *Attorney, Agent, or Firm* — Whitmyer IP Group LLC

(57) ABSTRACT

An offshore wind turbine assembly is disclosed. The offshore wind turbine assembly includes cable meshes or networks arranged on at least two respective levels along the longitudinal direction of the towers of floatable wind turbines in the offshore wind turbine assembly. The cable mesh at each level interconnects the wind turbines in the assembly so as to substantially maintain the position of each wind turbine relatively to the assembly when the entire assembly is located at an offshore position. By means of the arrangement of cable meshes, an upright orientation of the tower of each wind turbine in the assembly can be achieved by appropriately setting the interlevel spacing of the cable meshes.

18 Claims, 7 Drawing Sheets

(56) References Cited

U.S. PATENT DOCUMENTS

2011/0140426 A1* 6/2011 Garcia Lopez et al. ......... 290/44
2011/0148115 A1* 6/2011 Roznitsky et al. ............... 290/44

FOREIGN PATENT DOCUMENTS

| CN | 101965454 A | 2/2011 |
|---|---|---|
| CN | 102015435 A | 4/2011 |
| DE | 102010030694 A1 | 1/2012 |
| GB | 2400823 A | 10/2004 |
| GB | 2400823 B | 3/2005 |
| WO | 2009064737 A1 | 5/2009 |
| WO | WO 2009131826 A2 * 10/2009 ................ E02B 9/00 |

OTHER PUBLICATIONS

International Search Report and Written Opinion of the International Searching Authority Application No. PCT/EP2011/060112 Completed: Jan. 8, 2013; Mailing Date: Jan. 16, 2013 9 pages.

Chinese Office Action & Search Report Application No. 201180072456.3 October 21, 2015 7 pages.

* cited by examiner

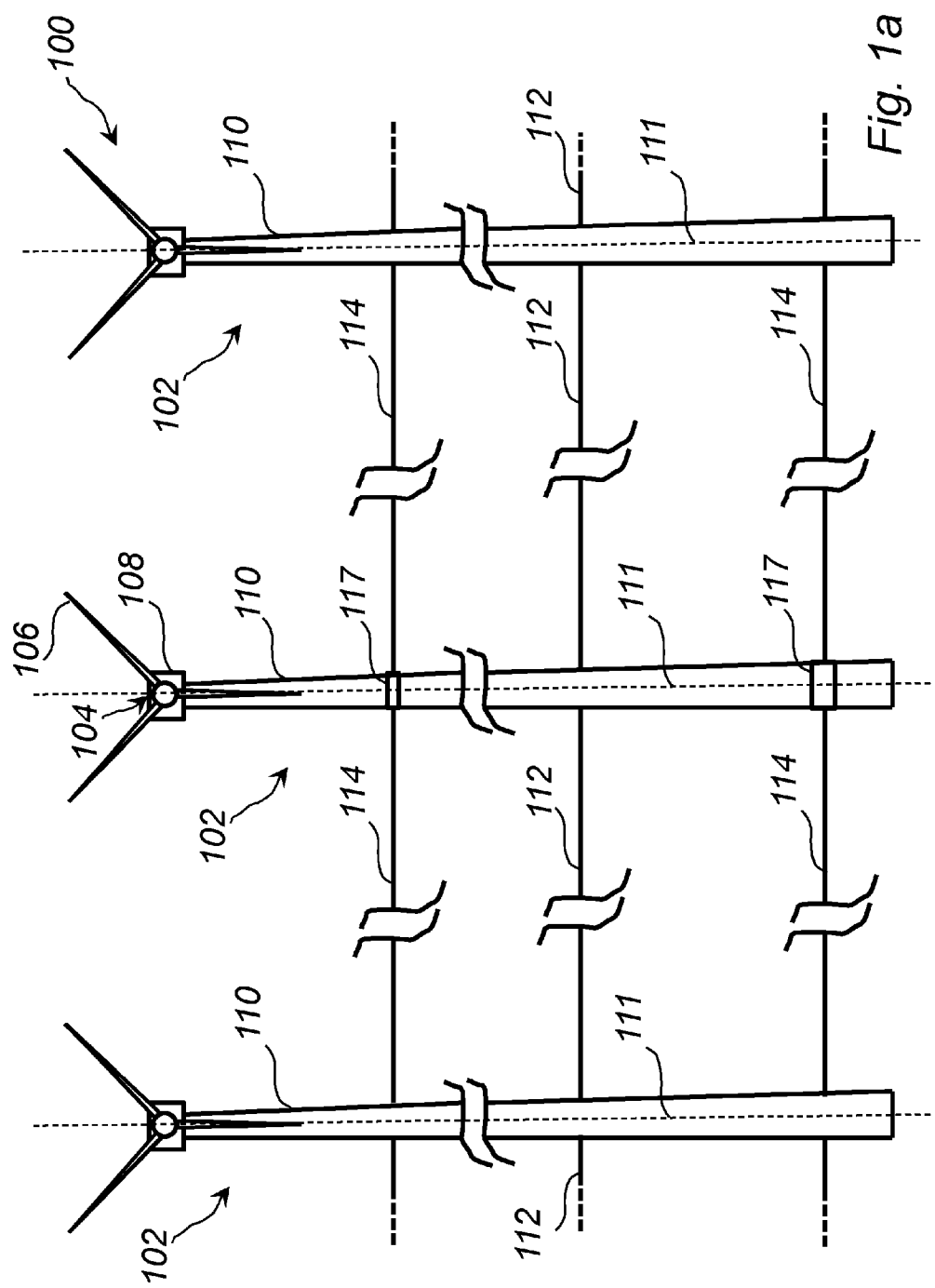

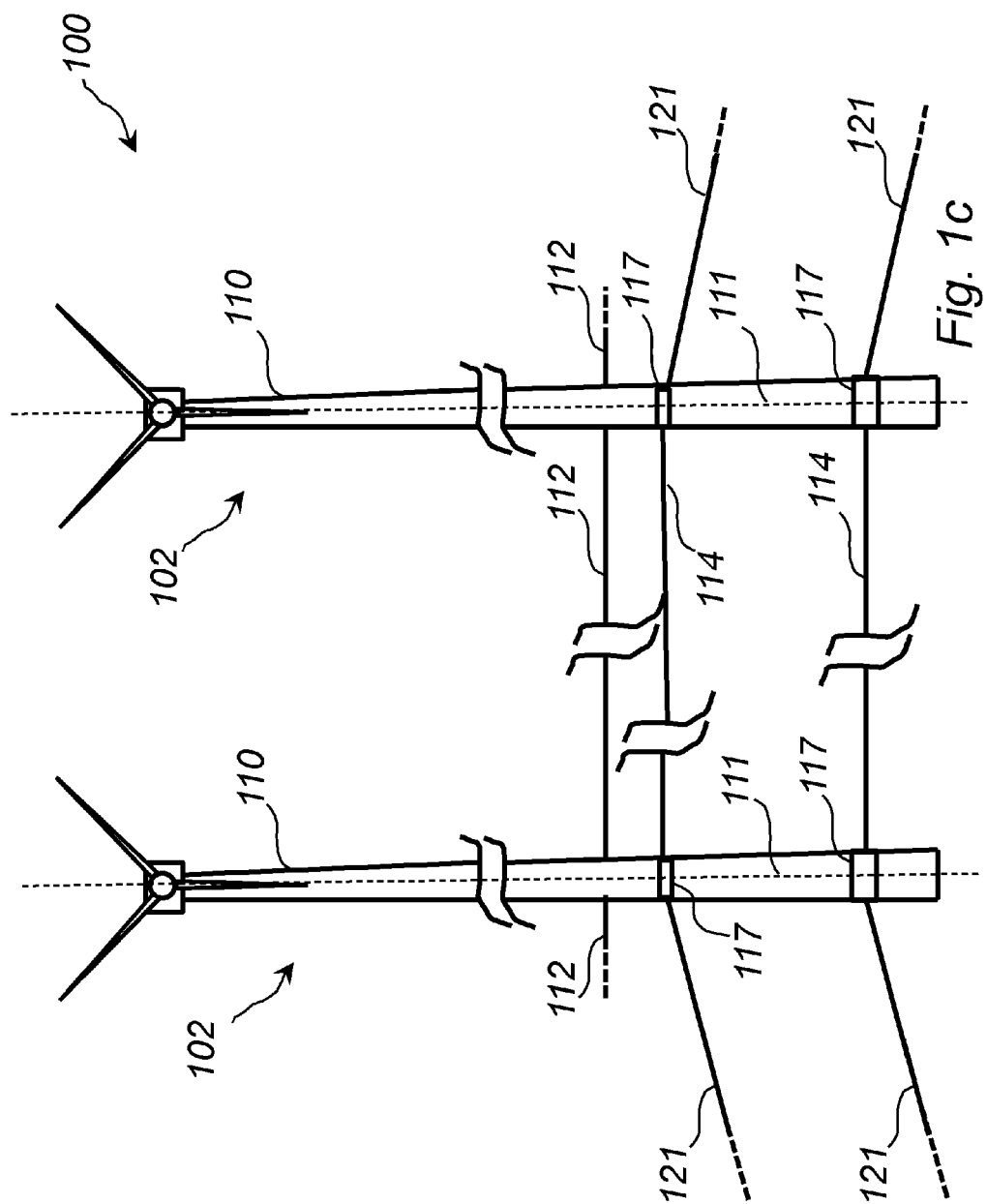

ALTERNATIVE MECHANICAL AND ELECTRICAL CONCEPT FOR OFFSHORE WIND FARMS

FIELD OF THE INVENTION

The present invention relates to an offshore wind turbine assembly, for example comprised in an offshore wind power production plant or offshore wind farm. Specifically, the present invention relates to an offshore wind turbine assembly comprising a plurality of wind turbines interconnected by means of a cable arrangement.

BACKGROUND OF THE INVENTION

Electrical power in public power grids, or utility grids, is supplied by a variety of energy sources that convert mechanical energy into electrical energy. With ever increasing costs of fossil fuels and possible environmental damage resulting from energy generation using fossil fuels, an increasing fraction of the electrical power supporting public power grids is generated at power plants utilizing renewable energy sources. Wind power plants are an example of such power plants. In a wind power plant or farm, a large number of wind turbines, typically numbering tens or hundreds or more, may be connected to a power grid in order to generate and supply electric power to consumers, which in general are remotely located with respect to the wind turbines. The power generated in the wind turbines is sent through transmission or distribution lines of the power grid to the consumers.

Offshore wind farms, i.e. wind farms located at sea at a distance from the shoreline, is a growing market, for example due to the less visual impact with respect to the surroundings offshore wind farms may have compared to wind farms installed on an onshore location, i.e. located on land, or in the water relatively close to shorelines. Moreover, by locating wind farms offshore, disturbance of residents caused by the generally significant amount of noise generated by the wind turbines can be mitigated or eliminated. Furthermore, locating wind turbines on land may not always be desirable, since in general it is desired that rotor blades of the wind turbine are situated in a laminate flow of air, which requirement may not always be met for onshore wind farms, for example due to presence of various obstacles such as hills, woods, buildings and other structures, etc.

It has hence become increasingly common to locate wind turbine assemblies offshore at a distance from the shoreline where water depths allow the wind turbines to be fixedly attached to a foundation provided at the bottom of the sea or on the seabed. At offshore locations, flow of air is not disturbed by presence of various obstacles such as mentioned above. Furthermore, as mentioned above, offshore localization of wind turbine assemblies may be desired from an aesthetic point of view.

Foundation structures used for accommodating and/or supporting wind turbines offshore may comprise monopile foundations, which can be used for fixedly arranging the towers of wind turbines in an offshore wind farm in relatively shallow-water subsea locations, i.e. on the seabed. Water depths at such shallow-water subsea locations where monopile foundations can feasibly be used typically is between 10 to 40 m.

For many shores, water depth rapidly increases with distance from the shoreline. Fixed foundation structures such as those mentioned above may give rise to prohibitively high costs at large water depths of about 50-80 m. Furthermore, installation of monopile foundations at such large water depths may be associated with technical issues that may be difficult to handle.

To this end, floatable structures for locating wind turbines offshore have been proposed e.g. in documents WO2009/064737 and US2010/0278630. One type of such floatable structures comprises a submerged buoyancy chamber supporting a wind turbine with the tower of the wind turbine arranged on the buoyancy chamber. A part of the submerged buoyancy chamber can be filled with a suitable ballast provided in order to locate the centre of gravity sufficiently below the centre of buoyancy of the submerged part of the structure in order to obtain a stable foundation for the wind turbine. In general, the ballast must be chosen such that the weight of the ballast is so high so as to sufficiently counteract wind and wave forces acting on the wind turbine. Such a floatable structure is typically individually moored to the seabed. However, particularly due to high weight ballast requirements, such floatable structures are in general associated with high costs with respect to among other things installation.

SUMMARY OF THE INVENTION

In view of the above discussion, a concern of the present invention is to provide an offshore wind turbine assembly that may enable reduction in costs, among other things with respect to installation.

To address this concern and other concerns, an offshore wind turbine assembly is provided. Preferred embodiments are also disclosed.

Generally, during operation of an offshore wind turbine assembly comprising a plurality of wind turbines it may be useful to be able to limit the inclination angle of the tower of each wind turbine relatively to the vertical direction so as to be within a predetermined range of inclination angles. A 'target' inclination angle of the tower of each wind turbine relatively to the vertical direction, i.e. a preferred inclination angle of the tower of each wind turbine relatively to the vertical direction, may be substantially 0°. However, in case the rotors of the wind turbines are of downwind type, i.e. where the rotors are arranged on the lee side of the respective wind turbine towers, a target inclination angle may be a few degrees, for example 2-5°, or up to 10°. The nacelles of the wind turbines may in that case be arranged at an angle with respect to the respective towers, such that the respective rotor is arranged substantially perpendicular to the wind direction. However, during operation of the offshore wind turbine assembly, wind forces acting on each wind turbine will be partly transformed into rotational energy of the blades and associated mechanical components of the wind turbine generator and partly transformed into a moment tending to tilt the tower of the wind turbine in the direction in the wind force acts, whereby the longitudinal axis of the tower of the wind turbine may tend to assume an angle relatively to the vertical direction outside the tolerated range of inclination angles.

The gist of the present invention is to provide cable meshes or networks arranged on at least two respective levels along the longitudinal direction of the towers of floatable wind turbines in an offshore wind turbine assembly. Hence, cable meshes or networks are arranged at at least two different levels along the longitudinal direction of the towers of floatable wind turbines. The cable mesh at each level interconnects the wind turbines in the assembly so as to substantially maintain the position of each wind turbine relatively to the assembly when the entire assembly is located at an offshore position. At the same time, by means of the arrangement of cable meshes an upright orientation of the tower of each wind
} turbine in the assembly can be achieved, by appropriately setting the interlevel spacing of the cable meshes. By the provision of such a cable mesh or network arrangement, there may be achieved a less expensive way of stabilizing the wind turbine towers in a wind turbine assembly, e.g. a wind farm, against forces due to wind, water currents and/or waves to which the wind turbines in the assembly may be subjected when the assembly is located at an offshore position, compared to utilizing a submerged buoyancy chamber filled with a ballast of appropriate weight for each wind turbine in the assembly for stabilizing the wind turbine against wind, water currents and/or wave forces during operation of the wind turbine.

According to a first aspect of the present invention, there is provided an offshore wind turbine assembly comprising a plurality of wind turbines adapted to be floatable on water when situated at an offshore location. Each wind turbine of the plurality of wind turbines comprises a support structure adapted to be partially submersed in water when situated at the offshore location. The support structure has a longitudinal axis. Each wind turbine of the plurality of wind turbines is connected with at least one of the other wind turbines by means of cables, which are arranged such that respective cables extend from at least a first and a second position being different from each other along the longitudinal axis of the support structure of the wind turbine to corresponding at least a first and a second position being different from each other along the longitudinal axis of each support structure of the respective at least one of the other wind turbines.

In other words, each wind turbine of the plurality of wind turbines may be connected with at least one of the other wind turbines by means of cables such that the plurality of wind turbines are interconnected.

When situated at the offshore location, the plurality of wind turbines may be subjected to forces caused by external conditions.

The cables may be arranged such that distances between the at least a first and a second position along the longitudinal axis of the support structure of each of the plurality of wind turbines is such so as to impede, inhibit and/or counter changes due to the forces caused by external conditions in orientation and/or position of the support structure of each of the plurality of wind turbines relatively to a vertical direction being parallel with a gravitational axis, which changes in orientation would cause an inclination angle of the longitudinal axis of the support structure relatively to the vertical direction to exceed a predetermined angle.

Hence, the distance between the at least a first and a second position along the longitudinal axis of the support structure of each of the plurality of wind turbines may be such so as to stabilize each of the plurality of wind turbines against forces caused by external conditions, to which forces each wind turbine of the plurality of wind turbines is subjected to.

The magnitude of the predetermined angle may account for a non-zero target inclination angle of the support structure or tower of each wind turbine relatively to the vertical direction such as described in the foregoing.

As discussed above, by means of the present invention a less expensive way of providing an offshore wind turbine assembly, for example being part of or constituting a wind power plant, may be achieved.

By means of the cable arrangement according to the present invention interconnecting the plurality of wind turbines, the need for anchoring or mooring of each wind turbine, or the support structure of each wind turbine, in the wind turbine assembly to the bottom of the sea may be mitigated or even completely eliminated. The present invention may allow for only one or more wind turbines, e.g. situated at the periphery of the wind turbine assembly, being anchored. This is further described in the following.

The cable arrangement according to the present invention interconnecting the plurality of wind turbines may allow for simplifying a power collection system of the wind turbine assembly, for example for collecting, conveying and/or distributing power generated by the respective wind turbines, since such a power collection system can be integrally arranged with the cable arrangement or even constituted by the cable arrangement. This is further described in the following.

By the present invention mitigating or even avoiding the need for foundation structures such as monopile foundations, the installation process for a wind turbine assembly according to the present invention at an offshore location may entail a reduced complexity. Although the Applicant wishes not to be bound to any theory, it is contemplated that a wind turbine assembly according to the present invention may be installed at an offshore location in the following manner. The wind turbines to be included in the assembly are positioned in some formation near the shore in relatively shallow water. The wind turbines are then pulled or towed to the desired location at sea by means of a towing vessel or the like. Once each wind turbine is located at substantially the desired position relatively to the other wind turbines, the cable arrangement is installed. Possibly, one or a few of the wind turbines situated at the periphery of the wind turbine assembly are connected to the seabed.

The support structure may for example comprise a tower and/or a semisubmersible platform of the respective wind turbine.

Hence, the cables may be arranged so as to extend from the tower of the respective wind turbines and/or so as to extend from a semi-submersible platform or the like, e.g. adapted to support the tower.

External conditions may comprise environmental loads to which each wind turbine of the plurality of wind turbines is subjected to, such as winds, water currents and/or waves of varying strength and direction exerting forces on each wind turbine. Hence, forces caused by external conditions may be forces acting on a wind turbine and/or support structure of the wind turbine caused by the wind turbine and/or support structure being subjected to, e.g., winds, water currents and/or waves of varying strength and direction.

In the context of the present invention, by cables it is meant chains, wires, ropes, and/or hawsers, etc. Each of these may be made of a suitable material, e.g., steel, a polymer, a metal, an alloy and/or compounds thereof.

In the context of the present application, by hawser it is meant a relatively thick cable or rope typically used for mooring or towing a ship or a boat.

The gravitational axis may be parallel with the direction of the gravity field.

Each of the cables may have a predetermined tension, wherein the predetermined tension in each of the respective cables is such so as to impede the changes due to the forces caused by external conditions in orientation of the support structure of each of the plurality of wind turbines relatively to the vertical direction.

The offshore wind turbine assembly may comprise a tension control device adapted to adjust tension in cables so as to impede the changes due to the forces caused by external conditions in orientation of the support structure of each of the plurality of wind turbines relatively to the vertical direction mentioned above, which changes in orientation would cause an inclination angle of the longitudinal axis of the tower relatively to the vertical direction to exceed a predetermined angle.

By means of such a tension control device an active and/or passive adjustment and/or control of tension in cables may be achieved. This is discussed further in the following.

The tension control device may be adapted to independently adjust tension in respective cables so as to impede the changes due to the forces caused by external conditions in orientation of the support structure of each of the plurality of wind turbines relatively to the vertical direction. Hence, tension in each cable may be adjusted independently with respect to adjustment of tension in other cables.

By means of the tension control device a passive adjustment and/or control of tension in cables may be achieved. To this end, the tension control device may for example comprise at least one of a spring member, a mechanical pendulum member and a wave deflector member, for effectuating adjustment of tension in cables. This list is not exhaustive.

The wave deflector member may be adapted to impede, mitigate or counter waves from hitting the support structure of each of the plurality of wind turbines so as to impede, mitigate or counteract forces causing undesired motion and tilting of the support structure.

Alternatively or optionally, by means of the tension control device an active adjustment and/or control of tension in cables may be achieved. To this end, the offshore wind turbine assembly may comprise an orientation sensor adapted to sense the inclination angle of the longitudinal axis of the support structure of each of the plurality of wind turbines relatively to the vertical direction. The tension control device may be adapted to, on basis of sensed inclination angle, adjust tension in cables so as to impede the changes due to the forces caused by external conditions in orientation of the support structure of each of the plurality of wind turbines relatively to the vertical direction.

Alternatively or optionally, the offshore wind turbine assembly may comprise a tension sensor adapted to sense tension in respective cables. The tension control device may be adapted to, on basis of sensed tension in the respective cables, adjust tension in cables so as to impede the changes due to forces caused by external conditions in orientation of the support structure of each of the plurality of wind turbines relatively to the vertical direction.

Alternatively or optionally, the offshore wind turbine assembly may comprise an operational state sensor adapted to sense operational state of respective cables. The tension control device may be adapted to, on basis of sensed operational state of the respective cables, adjust tension in cables so as to impede the changes due to the forces caused by external conditions in orientation of the support structure of each of the plurality of wind turbines relatively to the vertical direction.

Operational state of a cable may for example comprise cable failure, i.e. a state of the cable having ceased to function as intended, e.g. due to a connection of the cable to a support structure being released or lost. Operational state of a cable may comprise a state of cable degradation such that the cable is unable to withstand a predefined tension.

Alternatively or optionally, the operational state sensor may be adapted to sense for example whether a wind turbine is in an idle state, i.e. not producing any power or only producing power below a predefined threshold value, or a non-idle state and/or if a wind turbine has been removed from the wind turbine assembly, e.g. temporarily removed from the wind turbine assembly for repairs etc. On basis of the sensing, the tension control device may be adapted to adjust tension in cables so as to impede the changes due to the forces caused by external conditions in orientation of the support structure of each of the plurality of wind turbines relatively to the vertical direction.

The operational state sensor may be adapted to sense whether respective cables are compliant with a predetermined cable failure criteria. The tension control device may be adapted to, on a condition that at least one cable is compliant with the predetermined failure criteria, adjust tension in cables so as to impede the changes due to the forces caused by external conditions in orientation of the support structure of each of the plurality of wind turbines relatively to the vertical direction.

The sensing of the operational state sensor as described in the foregoing may be performed by a processing unit, running appropriate computer-executable instructions or software for controlling the tension control device, on basis of operation of the tension control device.

For example, in case one or more of the cables fail, tension in one or more of the cables, or all of the cables, may be re-adjusted so as to compensate or account for the failed cable or cables.

The compliance with the predetermined cable failure criteria may for example be based on fuzzy logic or some other form of logic or statistics.

In addition or optionally, the offshore wind turbine assembly may comprise some 'redundant' cables as a safety measure in case one or more cables should fail, the redundant cables interconnecting wind turbines in the same way as described in the foregoing. In this way, there may be ensured that in case one or more of cables should fail that still functioning cables are able to, by their arrangement, impede the changes due to forces caused by external conditions in orientation of the support structure of each of the plurality of wind turbines relatively to the vertical direction.

In the context of the present application, by redundant cables it is meant cables that are normally not required in order to manage to impede the changes due to forces caused by external conditions in orientation of the support structure of each of the plurality of wind turbines relatively to the vertical direction, but that may be required in case one or more of the cables should fail.

Such redundant cables may for example be arranged in the wind turbine assembly where environmental loads are expected to be high. That is, such redundant cables may be arranged so as to interconnect wind turbines located in the wind turbine assembly at positions where environmental loads are expected to be high, for example at wind turbines situated at the periphery of the wind turbine assembly where winds, waves and/or water currents in their respective dominant directions are directly hitting the wind turbine assembly.

Such redundant cables may be arranged such as to extend between different levels along the longitudinal direction of the support structure of respective wind turbines.

Such redundant cables may be arranged such as to extend between wind turbines in the wind turbine assembly situated adjacent relatively each other.

Alternatively or optionally, such redundant cables may be arranged such as to extend between non-adjacent wind turbines in the wind turbine assembly, i.e. not between nearest neighbor wind turbines in the wind turbine assembly but e.g. between next-nearest neighbor wind turbines in the wind turbine assembly or even between wind turbines in the wind turbine assembly situated further apart within the wind turbine assembly.

The tension control device may be adapted to adjust tension in cables such that the inclination angle of the longitudinal axis of the support structure of each of the plurality of wind turbines relatively to the vertical direction is within a predetermined range of angles. An inclination angle relatively to the vertical direction being within a range of a few degrees with respect to the vertical direction may be tolerated, e.g., one to five degrees. For example, the predetermined range of angles may comprise from −3° to +3°.

For achieving active adjustment and/or control of tension in cables, the tension control device may for example comprise a motor drive unit such as a winder or a winch, an electrical member, a hydraulic member, a pneumatic member, a linear actuator member and/or a friction disc member for effectuating adjustment of tension in cables. This list is not exhaustive.

The hydraulic member may for example comprise a hydraulic winder and/or winch member.

According to one example, the tension control device comprises a hydraulic member, such as a hydraulic winch member, and/or a pneumatic member, such as a pneumatic winch member, coupled with a motor for effectuating adjustment of tension in cables.

The motor may be operable by a processing unit running appropriate computer-executable instructions or software in order to adjust tension in cables so as to impede the changes due to the forces caused by external conditions in orientation of the support structure of each of the plurality of wind turbines relatively to the vertical direction. The adjustment of tension in cables may for example be performed on basis of the load on the motor, which may indicate the magnitude of the forces caused by external conditions which the wind turbine or wind turbines when situated at the offshore location are subjected to.

The linear actuator member may be of mechanical type, electromechanical type, hydraulic type, pneumatic type, piezoelectrical type, etc. This list is not exhaustive.

The offshore wind turbine assembly may comprise a control module adapted to monitor and/or control operation of each of the wind turbines of the plurality of wind turbines.

The offshore wind turbine assembly may comprise an operational state sensor adapted to sense operational state of respective cables.

The operational state sensor may be adapted to sense whether respective cables are compliant with a predetermined cable failure criteria. The control module may be adapted to, on a condition that at least one cable is compliant with the predetermined failure criteria, at least momentarily deactivate operation of at least a wind turbine coupled with the at least one cable being compliant with the predetermined failure criteria.

For example, in case one of the cables should fail, the rotor of one or more of the wind turbines may be shut off. At least the rotor or rotors of the wind turbine or wind turbines coupled with the cable that has failed may be shut off. By shutting off a rotor, the load on the rotor, and hence the load on the entire wind turbine, may become smaller due to the rotor being subjected to smaller wind forces when being shut off compared to when rotating.

On a condition that a wind turbine has been deactivated, the wind turbine may be at least temporarily provided with a suitable supplemental or additional ballast in order to increase the stability of the support structure of the wind turbine with respect to deviations of an inclination angle of the longitudinal axis of the support structure relatively to the vertical direction so as to exceed a predetermined angle.

In order to at least temporarily provide a wind turbine with a supplemental or additional ballast, a suitable medium such as water and/or sand may for example be pumped into a hollow portion of the support structure of the wind turbine in such a way so as to displace the centre of gravity of the support structure towards the lower end of the submerged portion of the support structure. When not required further, the sand and/or water can be pumped out of the hollow portion of the support structure.

The offshore wind turbine assembly may comprise at least one anchor member adapted to anchor the wind turbine assembly. The at least one anchor member may be connected to at least one wind turbine that is peripherically arranged with respect to the wind turbine assembly, i.e. with respect to all of the plurality of wind turbines.

By means of the cable arrangement interconnecting the wind turbines in the wind turbine assembly according to the present invention, mooring of each wind turbine in the wind turbine assembly, e.g. connection of each wind turbine to the seabed, may not be required. For example, only one or more wind turbines situated at the periphery of the wind turbine assembly, i.e. at the 'edge' of the wind turbine assembly may be anchored. By such a configuration the anchoring or mooring of the wind turbine assembly may become less complex since anchoring or mooring of each wind turbine, or the support structure of each wind turbine, in the wind turbine assembly, may not be required. In turn, this may entail less costs associated with installation of the wind turbine assembly at an offshore position compared to a case where each wind turbine of the assembly would have to be individually anchored or moored to the bottom of the sea.

The at least one anchor member may be any appropriate anchor member capable of mooring one or more floatable wind turbines. For example, the at least one anchor means may comprise a suction anchor.

The offshore wind turbine assembly may be adapted to be installed at an offshore location at sea. The at least one anchor member may be releasably connectable to the bottom of the sea.

The offshore wind turbine assembly may comprise a power collection and/or communications system, interconnecting each of the plurality of wind turbines. The power collection and/or communications systems may be adapted to at least collect, convey and/or distribute power generated by the respective wind turbines of the plurality of wind turbines, and/or communicate control signals to and/or from the respective wind turbines of the plurality of wind turbines for at least monitoring and/or controlling operational state of the respective wind turbine.

The power collection and/or communications systems may for example be adapted to at least collect, convey and/or distribute power generated by the respective wind turbines of the plurality of wind turbines to a power grid to which the offshore wind turbine assembly is connectable. Hence, the offshore wind turbine assembly may constitute or be comprised in a power production plant. The power grid may for example comprise a wind power plant collection grid or a power grid, or utility grid, for supplying electric power to consumers which in general are remotely located with respect to the power production plant.

The power collection and/or communications system may be at least partially integrally arranged with at least some of the cables inter-connecting the plurality of wind turbines.

Alternatively or optionally, the power collection and/or communications system may be at least partially comprised in at least some of the cables interconnecting the plurality of wind turbines.

Hence, the cable arrangement interconnecting the wind turbines in the wind turbine assembly according to the present invention may additionally be used for, e.g., collecting, conveying and/or distributing power generated by the respective wind turbines of the plurality of wind turbines. The power generated by the respective wind turbines of the plurality of wind turbines may be conveyed and/or distributed within the wind turbine assembly itself and/or to a power grid to which the offshore wind turbine assembly is connectable. By such a configuration, power collection grid may be simplified due to the wind turbines being connected directly from support structure to support structure, e.g. from tower to tower, reducing or even eliminating the need for electrical conductors connecting each wind turbine to subsea connector installed on the bottom of the sea.

The respective at least two different positions along the longitudinal axis of the support structure of a wind turbine may comprise at least a first position and a second position along the longitudinal axis of the support structure of the wind turbine. The first position may be located at a lower submerged position along the longitudinal axis of the support structure of the wind turbine, and the second position may be located at an upper unsubmerged position along the longitudinal axis of the support structure of the wind turbine.

Hence, the second position may be above the waterline or water level and the first position may be below the waterline.

According to another example, both the first and second position may be located at respective submerged positions along the longitudinal axis of the support structure of the wind turbine. Hence, both the first and second position may be located below the waterline. One of the first and second positions may be located at a lower submerged position along the longitudinal axis of the support structure of the wind turbine and the other may be located along the longitudinal axis of the support structure of the wind turbine below but close to the waterline.

According to yet another example, both the first and second position may be located above the waterline.

The wind turbine may comprise a rotor arranged at an upper unsubmerged end of the support structure of the wind turbine. The second position may be located at a distance along the longitudinal axis of the support structure of the wind turbine from the upper unsubmerged end, which distance is equal to or exceeding the rotor radius.

The term rotor radius may entail the radius of a circular path defined by the rotation of the tips of a plurality of rotor blades comprised in the rotor during rotation of the rotor blades. Hence, the wind turbine may comprise a rotor comprising a plurality of rotor blades, e.g., two, three, four, five or six or more rotor blades.

In other words, the second position may be located such that cables extending from the second position along the longitudinal axis of a support structure are out of the way for rotor blades of a rotor of the wind turbine when the rotor blades are rotating.

Alternatively or optionally, the second position may be located such that seagoing vessels such as boats are able to pass under cables extending from the second position along the longitudinal axis of a support structure.

The first position may be located at a lower submerged end of the support structure of the wind turbine.

Although the Applicant does not wish to be bound by any theory, it may be desirable to arrange the cables such that distance between the first position and the second position along the longitudinal axis of the support structure of each of the plurality of wind turbines, e.g. the distance between levels of two respective cable meshes or networks interconnecting the wind turbines, becomes as large as feasibly can be managed, in order to increase effectiveness and/or capacity of impeding the changes due to forces caused by external conditions in orientation of the support structure of each of the plurality of wind turbines relatively to the vertical direction.

The cables extending from the support structure of at least one the wind turbines of the plurality of wind turbines may be coupled with the support structure by means of a coupling unit arranged on the support structure so as to enable rotation of the support structure about its longitudinal axis.

For example, the coupling unit may be substantially freely rotatable about the longitudinal axis of the support structure, e.g. by means of a swivel or similar means rotatably, and possibly coaxially, mounted on the support structure.

Hence, the cables extending from the support structure of a wind turbine may be coupled to the support structure and/or wind turbine such as to allow for rotation of the support structure about its longitudinal axis.

Such a configuration may among other things allow for rotation of the support structure so as to 'follow' the wind direction, which in turn allows for a nacelle and/or a rotor of the wind turbine to follow the wind direction. This may be particularly useful in case the rotor of the wind turbine is of downwind type, i.e. where the rotor is arranged on the lee side of the support structure. Hence, such a configuration may allow for utilizing a wind turbine in which the rotor is arranged downwind of the support structure, which among other things may mitigate or even eliminate the need for a yaw mechanism for causing the rotor to continually face the wind, such as in upwind type of wind turbines where the wind generally reaches the rotor before it reaches the support structure itself.

Alternatively, the cables extending from the support structure of at least one the wind turbines of the plurality of wind turbines may be fixedly arranged on the support structure, e.g. by means of bolts and/or rivets.

Alternatively or optionally, the support structure may comprise a nacelle and/or a rotor rotatably arranged on the support structure so as to enable rotation of the nacelle and/or rotor about the longitudinal axis or yaw axis of the support structure. For example, the nacelle and/or rotor may be rotated about the longitudinal axis or yaw axis of the support structure so as to continually face the wind.

The support structure of at least one of the plurality of wind turbines may be arranged so as to provide buoyancy to the support structure. For example, the support structure may comprise a hollow portion providing buoyancy to the support structure.

Alternatively or optionally, the support structure of at least one of the plurality of wind turbines may comprise a buoyancy member adapted to provide buoyancy to the support structure. Such a buoyancy member may be constituted by a portion of the support structure adapted to provide buoyancy to the support structure, e.g. a section or portion of the support structure having a greater circumference than other sections or portions of the support structure.

The buoyancy member may comprise at least one buoyancy chamber coupled to the support structure. The at least one buoyancy chamber may comprise a medium adapted to provide buoyancy to the support structure. Such a medium may for example comprise air.

According to a second aspect of the present invention, there is provided a wind turbine power production plant comprising an offshore wind turbine assembly according to the present invention.

Further objects and advantages of the present invention are described in the following by means of exemplifying embodiments.

It is noted that the present invention relates to all possible combinations of features recited herein. Further features of, and advantages with, the present invention will become apparent when studying the following description. Those skilled in the art will realize that different features of the present invention can be combined to create embodiments other than those described in the following.

BRIEF DESCRIPTION OF THE DRAWINGS

Exemplifying embodiments of the invention will be described below with reference to the accompanying drawings, in which:

FIGS. 1a-1d are schematic views of offshore wind turbine assemblies according to exemplifying embodiments of the present invention;

In the accompanying drawings, the same reference numerals denote the same or similar elements throughout the views.

DETAILED DESCRIPTION OF THE INVENTION

Figure 1B:
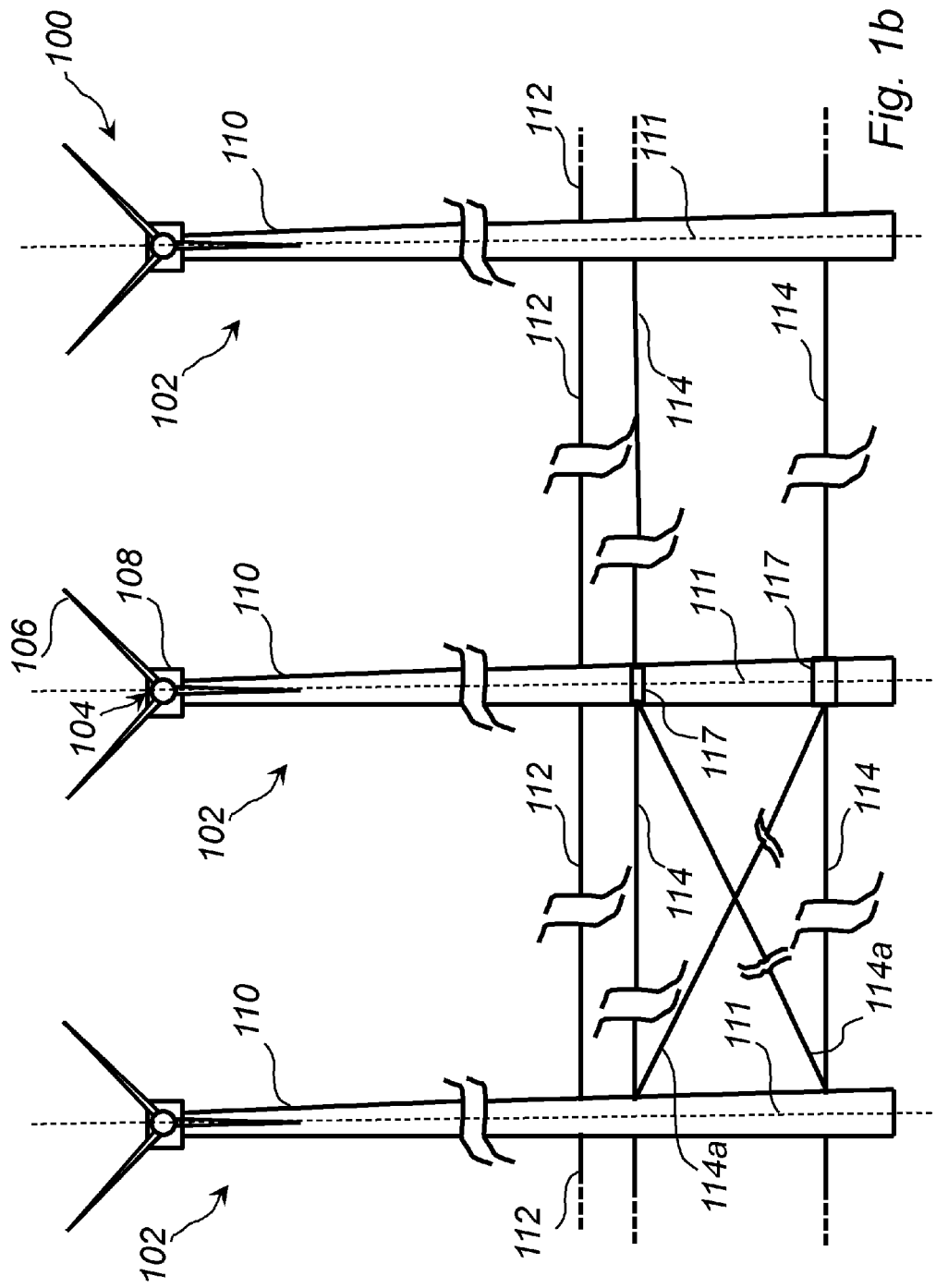

The present invention will now be described more fully hereinafter with reference to the accompanying drawings, in which exemplifying embodiments of the present invention are shown. This present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements or components throughout.

Referring now to FIG. 1a, there is shown a schematic view of an offshore wind turbine assembly 100 according to an exemplifying embodiment of the present invention.

The offshore wind turbine assembly 100 comprises a plurality of wind turbines 102, three of which are being depicted in FIG. 1a. Not all of the wind turbines comprised in the wind turbine assembly 100 are shown in FIG. 1a. Hence, the wind turbine assembly 100 may comprise more than three wind turbines, for example tens or hundreds or more wind turbines. However, the wind turbine assembly may comprise two wind turbines only, which is described further below with reference to FIGS. 1c and 1d.

Each wind turbine 102 comprises a rotor 104 comprising a plurality of blades 106 and a nacelle 108. The nacelle 108 may include one or more components such as a generator, transmission means, drive train, gear-box, etc. The individual components of the nacelle 108 are not shown in FIG. 1. Each wind turbine 102 comprises a support structure 110 in the form of an elongated member such as a mast or tower 110, in the following referred to as a tower. Each tower 110 has a longitudinal axis 111.

FIG. 1a depicts the situation when the offshore wind turbine assembly 100 is located at an offshore position. Reference numeral 112 indicates the waterline or water level.

The wind turbines 102 are adapted to be floatable in water when situated at the offshore position or location. The buoyancy of each of the wind turbines 102 may be provided by the arrangement of the respective towers 110. For example, the towers 110 can be arranged so as to comprise hollow tubes or the like comprising air for providing buoyancy to the wind turbines 102.

As depicted in FIG. 1a, the tower 110 of each wind turbine 102 is adapted to be partially submersed in water when situated at the offshore location, with a first portion of the tower 110 being submerged, arranged below the waterline 112, and a second portion of the tower 110 being unsubmerged, arranged above the waterline 112.

With further reference to FIG. 1a, each wind turbine 102 of the plurality of wind turbines 102 is connected with at least one of the other wind turbines 102 of the wind turbine assembly 100 (not all of the wind turbines comprised in the wind turbine assembly 100 are shown in FIG. 1a) by means of cables 114, which are arranged such that respective cables 114 extend from at least two different positions along the longitudinal axis 111 of the tower 110 of the wind turbine 102 to corresponding at least two different positions along the longitudinal axis 111 of each tower 110 of the respective at least one of the other wind turbines 102.

Each cable 114 may comprise or be constituted by a chain, wire, rope and/or hawser. This list is non-exhaustive. Each of the chain, wire, rope and/or hawser may be made of a suitable material, e.g., steel, a polymer, a metal, an alloy and/or compounds thereof.

Each of the cables 114 may have a predetermined tension.

When situated at the offshore location, the plurality of wind turbines 102 are subjected to forces caused by external conditions, such as environmental loads to which each wind turbine 102 of the plurality of wind turbines 102 is subjected to, such as winds, water currents and/or waves of varying strength and direction exerting forces on each wind turbine 102.

Figure 2:
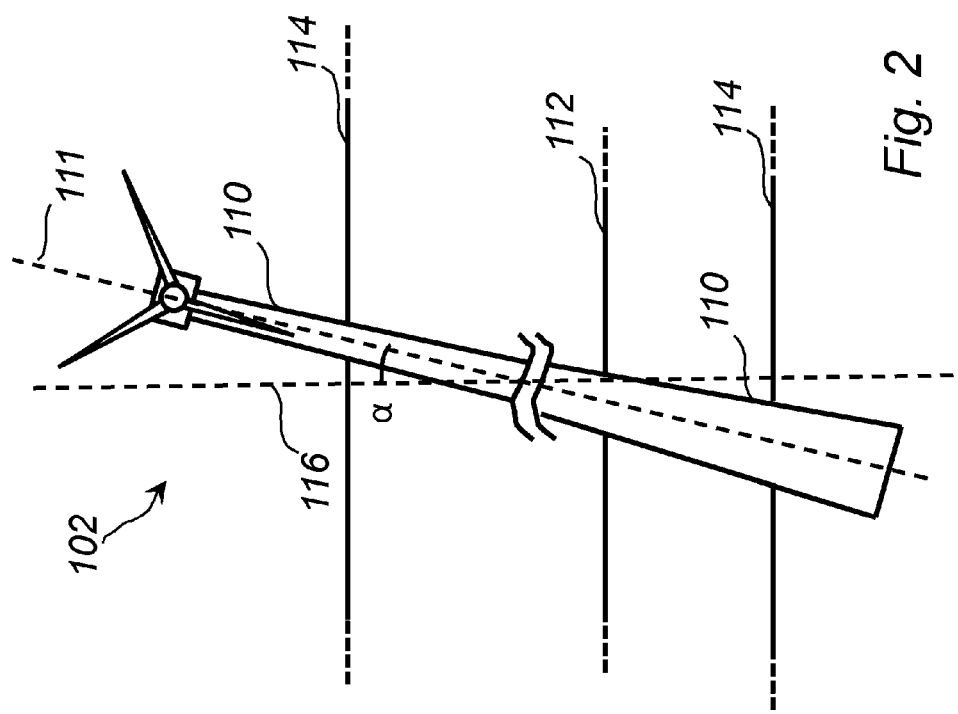
FIG. 2 is a schematic view of a wind turbine in accordance with an exemplifying embodiment of the present invention.

With further reference to FIG. 1a and also with reference to FIG. 2, the cables 114 are arranged such that distances between the at least two different positions along the longitudinal axis 111 of the tower 110 of each of the plurality of wind turbines 102 is such so as to impede changes due to the forces caused by external conditions in orientation of the tower 110 of each of the plurality of wind turbines 102 relatively to a vertical direction being parallel with a gravitational axis 116, which changes in orientation would cause an inclination angle α of the longitudinal axis of the tower 110 relatively to the vertical direction to exceed a predetermined angle.

Predetermined tension in each of the respective cables 114 may be such so as to impede the changes due to the forces caused by external conditions in orientation of the tower 110 of each of the plurality of wind turbines 102 relatively to the vertical direction.

The embodiments described with reference to the drawings refer to the case where the cables are arranged so as to extend from positions along the longitudinal axis of the tower of each wind turbine in the wind turbine assembly. Alternatively or optionally, the cables could be arranged so as to extend from a different part of portion of a support structure of the respective wind turbines. For example, the cables could be arranged so as to extend from a semisubmersible platform or the like (not shown in the drawings) supporting the tower.

In FIG. 2, the angle α is shown exaggerated for illustrating principles of the present invention. An inclination angle α relatively to the vertical direction being within a range of a few degrees with respect to the vertical direction may be tolerated, e.g., one to five degrees. For example, the range may be from about −3° to +3°.

With further reference to FIG. 1a, the cables 114 extending from the tower 110 of a wind turbine 102 may be coupled with the tower 110 by means of a coupling unit 117 arranged on the tower 110 so as to enable rotation of the tower 110 about its longitudinal axis 111.

The coupling unit 117 may for example be substantially freely rotatable about the longitudinal axis 111 of the tower 110. This may be achieved by means of a swivel or similar means (not shown in FIG. 1a), that is rotatably, and possibly coaxially, mounted on the tower 110. Hence, the tower 110 may be allowed to undergo rotation about its longitudinal axis 111.

According to one example (not shown in FIG. 1a, see FIG. 1c), the tower 110 of each wind turbine 102 in the wind turbine assembly 100 may be provided with a coupling unit 117 so as to enable rotation of the respective tower 110 about its longitudinal axis 111.

As depicted in FIG. 1a, the respective two different positions along the longitudinal axis 111 of the tower 110 of a wind turbine 102 may comprise a first position and a second position along the longitudinal axis 111 of the tower 110 of the wind turbine 102. The first position may be located at a lower submerged position, i.e. below the waterline 112, along the longitudinal axis 111 of the tower 110 of the wind turbine 102. The second position may be located at an upper unsubmerged position, i.e. above the waterline 112, along the longitudinal axis 111 of the tower 110 of the wind turbine 102.

Depending on the diameter of the rotor 104 and on the length of the tower 110, the second position may according to one example be located about 60-70 m above the waterline 112.

According to one example, the first position may be located about 40 m below the waterline 112.

The second position may be located such that cables 114 extending from the second position along the longitudinal axis 111 of the tower 110 are out of the way for the blades 106 of the rotor 104 of the wind turbine 102 when the blades 106 are rotating. To this end, the second position can be located at a distance along the longitudinal axis 111 of the tower 110 from its upper unsubmerged end, the distance equaling or exceeding the radius of the rotor 104.

Typically, a rotor of a wind turbine capable of generating about 2 MW or more has a radius of about 40 m. A rotor of a wind turbine capable of generating about 5-10 MW typically has a radius of about 60-72 m or more.

Preferably, the second position is located such that seagoing vessels such as boats are able to pass under cables 114 extending from the second position along the longitudinal axis 111 of the tower 110.

In order to increase effectiveness and/or capacity of impeding the changes due to the forces caused by external conditions in orientation of the tower 110 of each of the plurality of wind turbines 102 relatively to the vertical direction, it may be desirable that the distances between the first position and the second position along the longitudinal axis 111 of the tower 110 of each of the plurality of wind turbines 102 are as large as feasibly can be managed.

It is contemplated that the distances between the first position and the second position along the longitudinal axis 111 of the tower 110 of each of the plurality of wind turbines 102 may be between about 40 m and 140 m, depending on among other things the length of the tower 110 and the radius of the rotor 104.

According to another example, depicted in FIG. 1b, both the first and second position may be located in the proximity of respective submerged positions along the longitudinal axis 111 of the tower 110 of each of the plurality of wind turbines 102. Hence, both the first and second position may be located below the waterline 112. It is contemplated that according to this example the distances between the first position and the second position along the longitudinal axis 111 of the tower 110 of each of the plurality of wind turbines 102 may be at least about 40 m.

With further reference to FIG. 1b, the offshore wind turbine assembly 100 can optionally comprise one or more redundant cables 114a as a safety measure in case one or more cables 114 should fail, as described in the foregoing. Such redundant cables 114a may for example be arranged in accordance with the exemplifying arrangement depicted in FIG. 1b.

Referring now to FIG. 1c, there is shown a schematic view of an offshore wind turbine assembly 100 according to an exemplifying embodiment of the present invention. The offshore wind turbine assembly 100 comprises two wind turbines 102.

Components indicated in FIG. 1c having corresponding reference numerals to components indicated in FIG. 1a or 1b are similar to or the same as the respective components described with reference to FIG. 1a or 1b, and the functions thereof are similar to or the same as the functions of the respective components described with reference to FIG. 1a or 1b.

FIG. 1c depicts the situation when the offshore wind turbine assembly 100 is located at an offshore position.

As depicted in FIG. 1c, several mooring cables or lines 121 effectuate connection of the respective wind turbines 102 to the seabed (not shown in FIG. 1c).

Figure 1D:
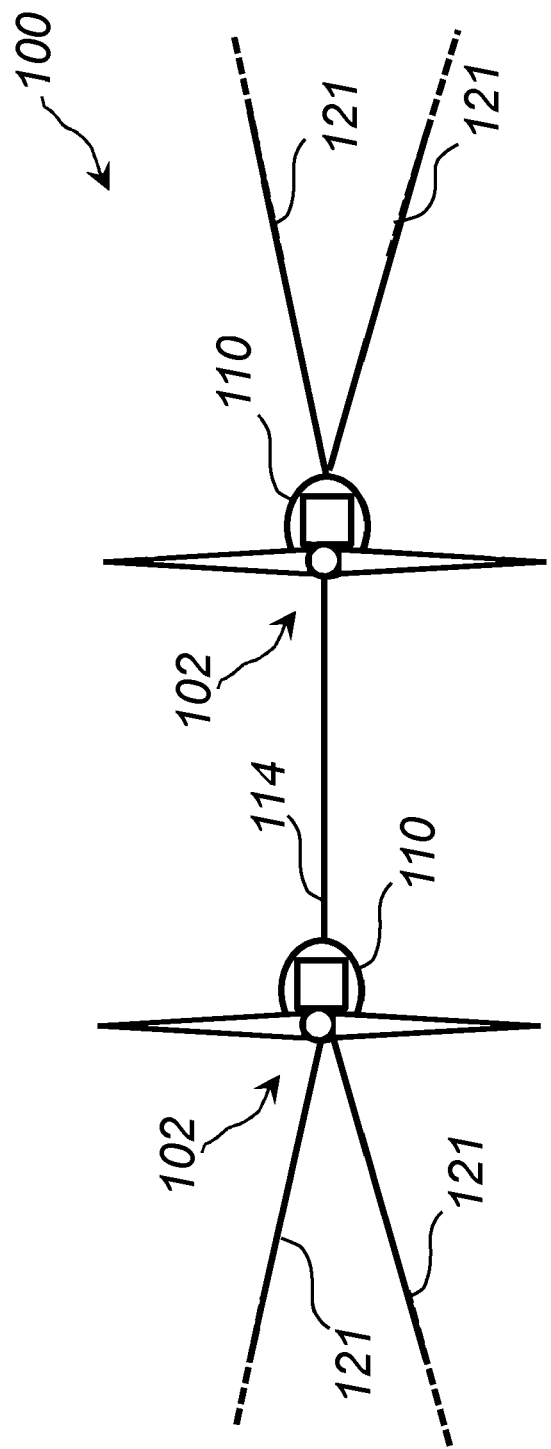

Referring now to FIG. 1d, there is shown the offshore wind turbine assembly 100 as seen from above, i.e. along a direction substantially parallel to the vertical direction.

Figure 3:
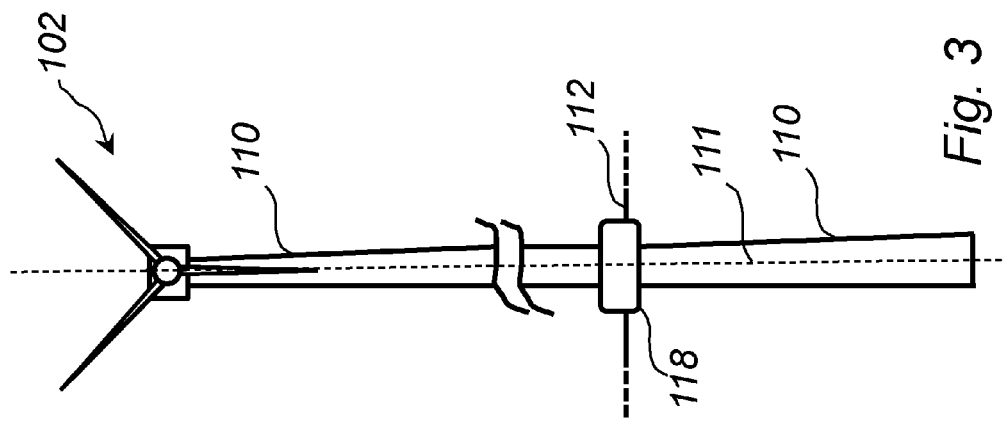
FIG. 3 is a schematic view of a wind turbine in accordance with an exemplifying embodiment of the present invention.

Referring now to FIG. 3, there is shown a schematic view of a wind turbine 102 in accordance with an exemplifying embodiment of the present invention.

The wind turbine 102 comprises a buoyancy member 118 adapted to provide buoyancy to the tower 110.

In FIG. 3, the buoyancy member 118 is depicted as a semi-submersible member arranged on the tower 110. Alternatively, the buoyancy member could be constituted by a portion of the tower 110 adapted to provide buoyancy to the tower. For example, such a portion of the tower 110 could for example comprise a section or portion of the tower 110 having a greater circumference than other sections or portions of the tower 110.

Figure 4A:
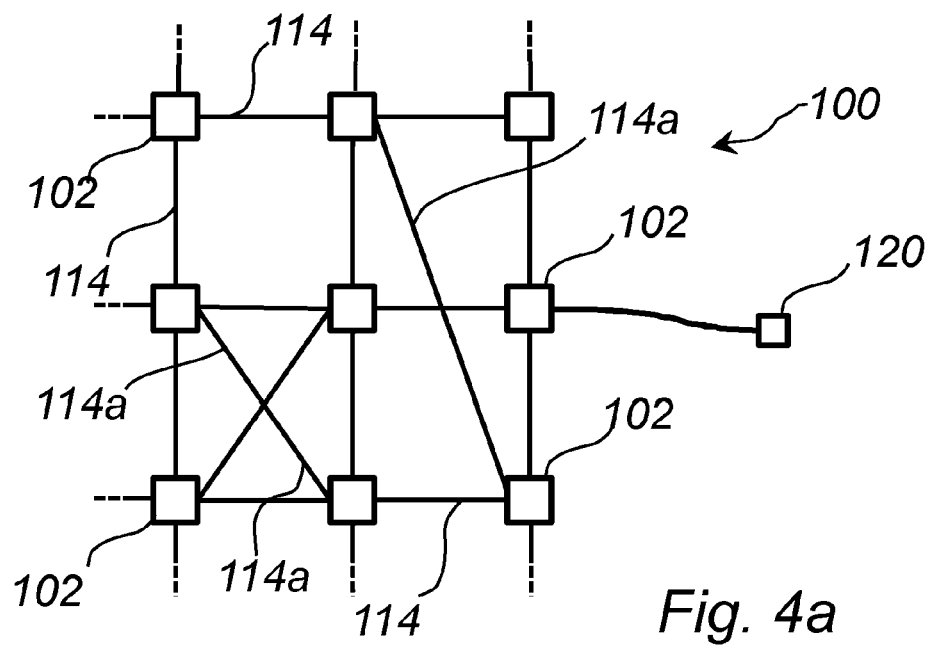
FIGS. 4a and 4b are schematic views of offshore wind turbine assemblies according to exemplifying embodiments of the present invention.
Figure 4B:
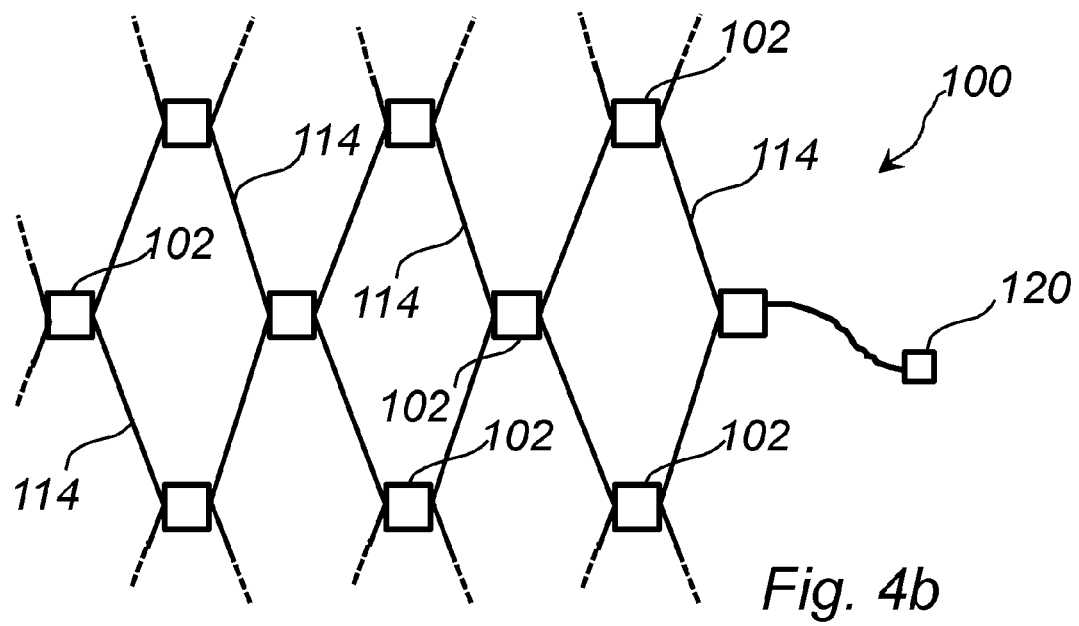

Referring now to FIGS. 4a and 4b, there are shown schematic views of offshore wind turbine assemblies 100 according to exemplifying embodiments of the present invention, as seen from the above. Each of FIGS. 4a and 4b depicts a part of an offshore wind turbine assembly 100.

FIGS. 4a and 4b depict the situation when the respective offshore wind turbine assemblies 100 are located at an offshore position.

Each of the wind turbine assemblies 100 comprises a plurality of wind turbines 102 interconnected by means of cables 114 such as has been described in the foregoing. Only a few wind turbines 102 and a few cables 114 in FIGS. 4a and 4b are indicated by reference numerals.

As depicted in FIGS. 4a and 4b, the wind turbines 102 may be arranged at the offshore location in parallel rows of wind turbines 102, either such that adjacent rows of wind turbines 102 are staggered relatively to each other, as depicted in FIG. 4b, or such that adjacent rows of wind turbines 102 are not staggered relatively to each other, as depicted in FIG. 4a, forming a square pattern as seen from the above.

The arrangements of the wind turbines 102 in the wind turbine assembly 100 relatively to each other as depicted in FIGS. 4a and 4b are exemplifying. Other arrangements are possible, e.g. arrangements where the wind turbines 102 form hexagonal, triangular, pentagonal or star patterns as seen from the above.

The distance between adjacent wind turbines 102 in the wind turbine assembly 100 typically is about seven times the diameter of the rotor of the wind turbines 102. However, the distance between adjacent wind turbines 102 in the wind turbine assembly 100 may be larger, about ten to fifteen times the diameter of the rotor of the wind turbines 102, which may be beneficial for the power production efficiency of the respective wind turbines. This distance may according to one example define the minimum distance between adjacent wind turbines 102 in the wind turbine assembly 100.

By means of the arrangement of cables 114 according to the present invention, interconnecting the wind turbines 102 in the wind turbine assembly 100, the need for anchoring or mooring of each wind turbine 102 in the wind turbine assembly 100 individually to the bottom of the sea may be mitigated or even completely eliminated. Instead, the anchoring or mooring of the wind turbine assembly 100 to the bottom of the sea may be effectuated at one or more wind turbines 102 in the wind turbine assembly 100 only, situated at the periphery of the wind turbine assembly 100, i.e. at the 'edge' of the wind turbine assembly 100. This is illustrated in FIGS. 4a and 4b by an anchor member 120, e.g. a suction anchor, adapted to anchor the wind turbine assembly 100.

According to one example, all of the wind turbines 102 in the wind turbine assembly 100 situated at the periphery of the wind turbine assembly 100 are anchored or moored to the bottom of the sea (cf. FIGS. 1c and 1d).

With reference to FIG. 4a, the offshore wind turbine assembly 100 can optionally comprise one or more redundant cables 114a as a safety measure in case one or more cables 114 should fail, as described in the foregoing with respect to FIGS. 1a and 1b. Such redundant cables 114a may for example be arranged in accordance with any of the exemplifying arrangements depicted in FIG. 4a.

Figure 5:
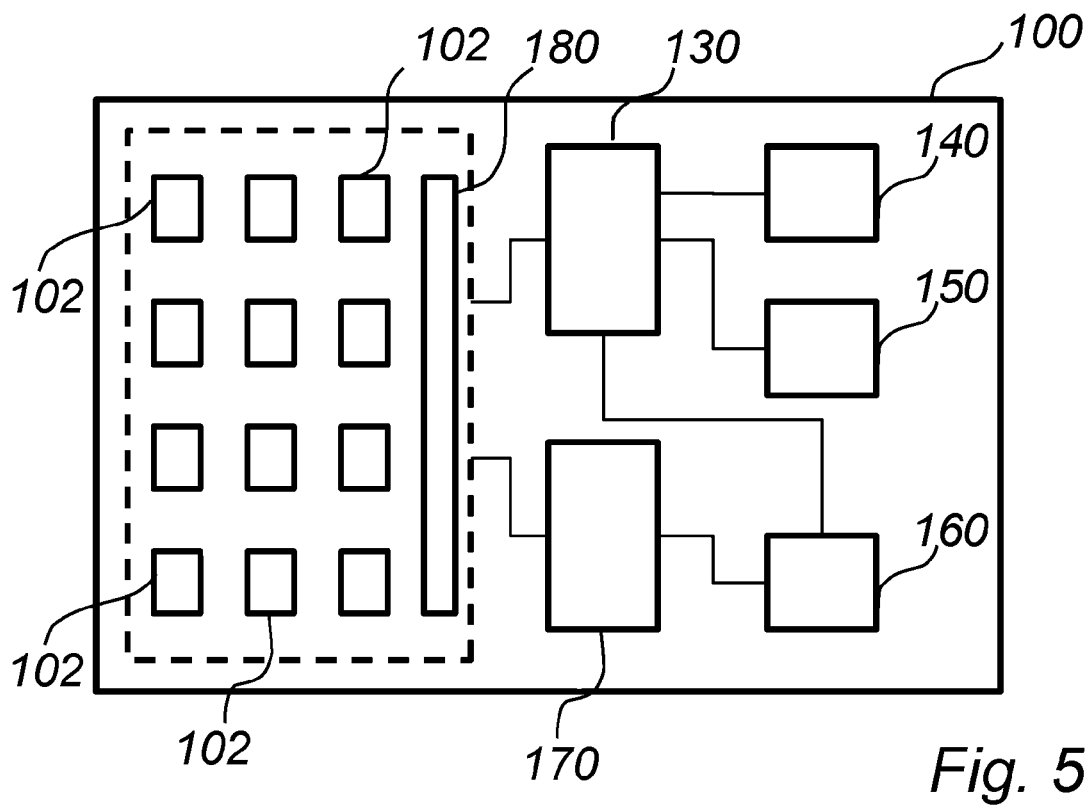
FIG. 5 is a schematic block diagram of an offshore wind turbine assembly according to an exemplifying embodiment of the present invention.

Referring now to FIG. 5, there is shown a schematic block diagram of an offshore wind turbine assembly 100 according to an exemplifying embodiment of the present invention.

The offshore wind turbine assembly 100 comprises a plurality of wind turbines 102, of which only a few are indicated by reference numerals in FIG. 5. The wind turbines 102 depicted in FIG. 5 are similar or identical to the wind turbines 102 described with reference to FIGS. 1a, 1b, 2 and/or 3 and have a function similar or identical to the function of the wind turbines 102 described with reference to FIGS. 1a, 1b, 2 and/or 3.

Each wind turbine 102 of the plurality of wind turbines 102 is connected with at least two of the other wind turbines 102 by means of cables (not shown in FIG. 5, see FIGS. 1a, 1b, 2 and/or 3). The cables are similar or identical to the cables 114 described with reference to FIGS. 1, 2 and/or 3 and have a function similar or identical to the function of the cables 114 described with reference to FIGS. 1a, 1b, 2 and/or 3.

With further reference to FIG. 5, the offshore wind turbine assembly 100 comprises a tension control device 130 adapted to adjust tension in cables so as to impede the changes due to the forces caused by external conditions in orientation of the tower (not shown in FIG. 5, see FIGS. 1a, 1b, 2 and/or 3) of each of the plurality of wind turbines 102 relatively to the vertical direction.

By means of the tension control device 130 an active adjustment and/or control of tension in cables may be achieved.

To this end, the offshore wind turbine assembly 100 comprises an orientation sensor 140 adapted to sense the inclination angle of the longitudinal axis of the tower of each of the wind turbines 102 relatively to the vertical direction. The tension control device 130 is adapted to, on basis of sensed inclination angle, adjust tension in cables so as to impede the changes due to the forces caused by external conditions in orientation of the tower of each of the wind turbines 102 relatively to the vertical direction.

The offshore wind turbine assembly 100 comprises tension sensors 150 adapted to sense tension in respective cables. The tension control device 130 may be adapted to, on basis of sensed tension in the respective cables, adjust tension in cables so as to impede the changes due to forces caused by external conditions in orientation of the tower of each of the wind turbines 102 relatively to the vertical direction.

The offshore wind turbine assembly 100 comprises an operational state sensor 160 adapted to sense operational state of respective cables. The tension control device 130 may be adapted to, on basis of sensed operational state of the respective cables, adjust tension in cables so as to impede the changes due to the forces caused by external conditions in orientation of the tower of each of the wind turbines 102 relatively to the vertical direction.

Each of the orientation sensor 140, the tension sensor 150 and the operational state sensor 160 is optional.

For example, the tension control device 130 may alternatively or optionally comprise a hydraulic member, such as a hydraulic winch member, coupled with a motor for effectuating adjustment of tension in cables. This configuration is not shown in FIG. 5. Such a motor may be operable by a processing unit running appropriate computer-executable instructions or software in order to adjust tension in cables, e.g. on basis of load on the motor such as described in the foregoing, so as to impede the changes due to the forces caused by external conditions in orientation of the tower of each of the plurality of wind turbines relatively to the vertical direction.

Hence, the tension sensing function may be incorporated in the tension control device.

The sensing of the operational state sensor 160 may be performed by a processing unit (not shown in FIG. 5), running appropriate computer-executable instructions or software for controlling the tension control device 130, on basis of operation of the tension control device 130.

The offshore wind turbine assembly 100 may comprise a control module 170 adapted to monitor and/or control operation of each of the wind turbines 102.

The operational state sensor 160 is adapted to sense whether respective cables are compliant with a predetermined cable failure criteria. On a condition that a cable is compliant with the predetermined failure criteria, the control module is adapted to at least momentarily deactivate operation of at least a wind turbine 102 that is coupled with the cable which is compliant with the predetermined failure criteria.

The offshore wind turbine assembly 100 comprises a power collection and/or communications system 180.

The power collection and/or communications systems 180 may be adapted to at least collect, convey and/or distribute power generated by the respective wind turbines 102 and/or communicate control signals to and/or from the respective wind turbines 102 for monitoring and/or controlling operational state of the respective wind turbines 102.

The power collection and/or communications system 180 is at least partially integrally arranged with at least some of the cables inter-connecting the wind turbines 102 and/or is at least partially comprised in at least some of the cables inter-connecting the wind turbines 102. Hence, the cable arrangement interconnecting the wind turbines 102 in the wind turbine assembly 100 according to the present invention can additionally be utilized e.g. for collecting, conveying and/or distributing power generated by the respective wind turbines 102.

Figure 6:
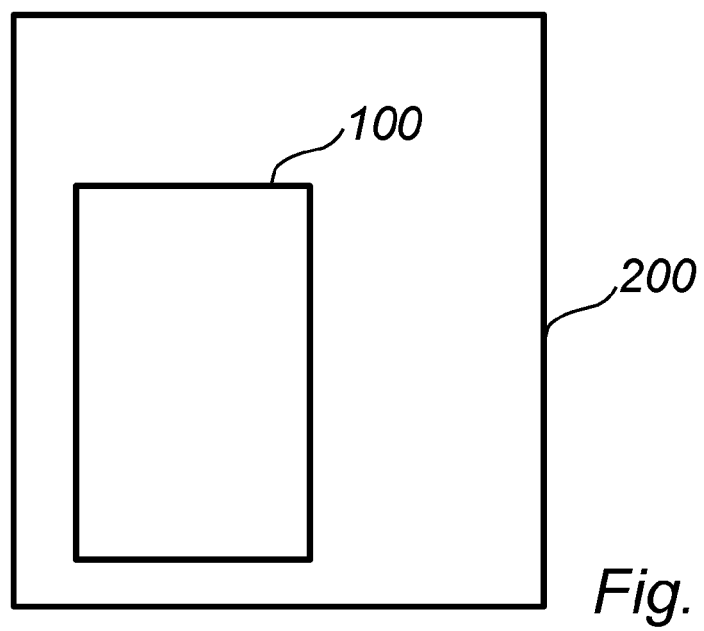
FIG. 6 is a schematic block diagram of a wind power production plant according to an exemplifying embodiment of the present invention.

Referring now to FIG. 6, there is shown a schematic block diagram of a wind power production plant 200 comprising an offshore wind turbine assembly 100 according to an embodiment of the present invention.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

What is claimed is:

1. An offshore wind turbine assembly comprising:
   a plurality of wind turbines floatable on water when situated at an offshore location, each wind turbine of the plurality of wind turbines comprising a support structure partially submerseable in water when situated at the offshore location, the support structure having a longitudinal axis;
   each wind turbine of the plurality of wind turbines being connected with at least one of the other wind turbines by means of cables substantially maintaining a position of each wind turbine relative to the assembly and an upright orientation of each wind turbine, the cables arranged such that respective cables extend from at least a first and a second position different from each other along the longitudinal axis of the support structure of the wind turbine to corresponding at least a first and a second position different from each other along the longitudinal axis of each support structure of the respective at least one of the other wind turbines;
   characterized in that the offshore wind turbine assembly further comprises a power collection and/or communications system interconnecting each of the plurality of wind turbines, wherein the power collection and/or communications system is at least partially comprised in at least some of the cables interconnecting the plurality of wind turbines, the power collection and/or communications systems being adapted to at least collect, convey or distribute power generated by the plurality of wind turbines.

2. The offshore wind turbine assembly according to claim 1, wherein the plurality of wind turbines when situated at the offshore location are subjected to forces caused by external conditions, the offshore wind turbine assembly further comprising a tension control device adapted to adjust tension in cables so as to impede the changes due to the forces caused by external conditions in orientation of the support structure of each of the plurality of wind turbines relatively to a vertical direction being parallel with a gravitational axis, which changes in orientation would cause an inclination angle of the longitudinal axis of the tower relatively to the vertical direction to exceed a predetermined angle.

3. The offshore wind turbine assembly according to claim 2, wherein the tension control device is adapted to independently adjust tension in respective cables so as to impede the changes due to the forces caused by external conditions in orientation of the support structure of each of the plurality of wind turbines relatively to the vertical direction.

4. The offshore wind turbine assembly according to claim 2, wherein the tension control device comprises at least one of a spring member, a mechanical pendulum member and a wave deflector member, the wave deflector member being adapted to impede waves from hitting the support structure of each of the plurality of wind turbines, for effectuating adjustment of tension in cables.

5. The offshore wind turbine assembly according to claim 2, further comprising an orientation sensor adapted to sense the inclination angle of the longitudinal axis of the support structure of each of the plurality of wind turbines relatively to the vertical direction, wherein the tension control device is adapted to, on basis of sensed inclination angle, adjust tension in cables so as to impede the changes due to the forces caused by external conditions in orientation of the support structure of each of the plurality of wind turbines relatively to the vertical direction.

6. The offshore wind turbine assembly according to claim 2, further comprising a tension sensor adapted to sense tension in the respective cables, wherein the tension control device is adapted to, on basis of sensed tension in the respective cables, adjust tension in cables so as to impede the changes due to the forces caused by external conditions in orientation of the support structure of each of the plurality of wind turbines relatively to the vertical direction.

7. The offshore wind turbine assembly according to claim 2, further comprising an operational state sensor adapted to sense operational state of respective cables, wherein the tension control device is adapted to, on basis of sensed operational state of the respective cables, adjust tension in cables so as to impede the changes due to the forces caused by external conditions in orientation of the support structure of each of the plurality of wind turbines relatively to the vertical direction.

8. The offshore wind turbine assembly according to claim 7, wherein the operational state sensor is adapted to sense whether respective cables are compliant with a predetermined cable failure criteria, and wherein the tension control device is adapted to, on a condition that at least one cable is compliant with the predetermined failure criteria, adjust tension in cables so as to impede the changes due to the forces caused by external conditions in orientation of the support structure of each of the plurality of wind turbines relatively to the vertical direction.

9. The offshore wind turbine assembly according to claim 1, further comprising:
   a control module adapted to monitor and/or control operation of each of the wind turbines of the plurality of wind turbines; and
   an operational state sensor adapted to sense operational state of respective cables;
   wherein the operational state sensor is adapted to sense whether respective cables are compliant with a predetermined cable failure criteria, and, wherein the control module is adapted to, on a condition that at least one cable is compliant with the predetermined failure criteria, at least momentarily deactivate operation of at least a wind turbine coupled with said at least one cable being compliant with the predetermined failure criteria.

10. The offshore wind turbine assembly according to claim 9, the power collection and/or communications systems being adapted to communicate control signals to and/or from the respective wind turbines of the plurality of wind turbines at least for monitoring and/or controlling operational state of the respective wind turbines.

11. The offshore wind turbine assembly according to claim 1, further comprising at least one anchor member adapted to anchor the wind turbine assembly, the at least one anchor member being connected to at least one wind turbine of the plurality of wind turbines being peripherally arranged with respect to the wind turbine assembly.

12. The offshore wind turbine assembly according to claim 1, the power collection and/or communications systems being adapted to communicate control signals to and/or from the respective wind turbines of the plurality of wind turbines at least for monitoring and/or controlling operational state of the respective wind turbines.

13. The offshore wind turbine assembly according to claim 1, wherein the first position is located at a lower submerged position along the longitudinal axis of the support structure of the wind turbine and the second position is located at an upper unsubmerged position along the longitudinal axis of the support structure of the wind turbine.

14. The offshore wind turbine assembly according to claim 13, wherein the wind turbine comprises a rotor arranged at an upper unsubmerged end of the support structure of the wind turbine, wherein the second position is located at a distance along the longitudinal axis of the support structure of the wind turbine from the upper unsubmerged end equal to or exceeding the rotor radius.

15. The offshore wind turbine assembly according to claim 13, wherein the first position is located at a lower submerged end of the support structure of the wind turbine.

16. The offshore wind turbine assembly according to claim 1, wherein the cables extending from the support structure of at least one of the wind turbines of the plurality of wind turbines are coupled with the support structure by means of a coupling unit arranged on the support structure so as to enable rotation of the support structure about its longitudinal axis.

17. The offshore wind turbine assembly according to claim 1, wherein the cables extending from the support structure of at least one the wind turbines of the plurality of wind turbines are fixedly arranged on the support structure.

18. The offshore wind turbine assembly according to claim 1, wherein the support structure of at least one of the plurality of wind turbines comprises a hollow portion providing buoyancy to the support structure.

* * * * *